US010594526B2

(12) United States Patent
Martinez

(10) Patent No.: US 10,594,526 B2
(45) Date of Patent: Mar. 17, 2020

(54) COMPOSITE SIGNAL PROCESSING IN A CELLULAR COMMUNICATION SYSTEM

(71) Applicant: NXP USA, Inc., Austin, TX (US)

(72) Inventor: Vincent Pierre Martinez, Roques (FR)

(73) Assignee: NXP USA, Inc., Austin, TX (US)

( * ) Notice: Subject to any disclaimer, the term of this patent is extended or adjusted under 35 U.S.C. 154(b) by 129 days.

(21) Appl. No.: 15/979,063

(22) Filed: May 14, 2018

(65) Prior Publication Data

US 2018/0331871 A1 Nov. 15, 2018

(30) Foreign Application Priority Data

May 15, 2017 (EP) ..................................... 17305554

(51) Int. Cl.
| | | |
|---|---|---|
| *H04W 4/00* | (2018.01) | |
| *H04L 27/26* | (2006.01) | |
| *H04W 88/08* | (2009.01) | |
| *H04W 72/04* | (2009.01) | |
| *H04L 27/02* | (2006.01) | |
| *H04L 5/00* | (2006.01) | |

(52) U.S. Cl.
CPC .......... *H04L 27/2607* (2013.01); *H04L 27/02* (2013.01); *H04L 27/2608* (2013.01); *H04L 27/2626* (2013.01); *H04L 27/2628* (2013.01); *H04L 27/2647* (2013.01); *H04L 27/2695* (2013.01); *H04W 72/0446* (2013.01); *H04W 88/085* (2013.01); *H04L 5/001* (2013.01); *H04L 5/0053* (2013.01)

(58) Field of Classification Search
None
See application file for complete search history.

(56) References Cited

U.S. PATENT DOCUMENTS

| 2011/0211489 A1 | 9/2011 | Chung et al. | |
|---|---|---|---|
| 2012/0250740 A1 | 10/2012 | Ling | |
| 2015/0215917 A1* | 7/2015 | Suzuki | .................... H04L 5/001 370/329 |
| 2015/0341134 A1* | 11/2015 | Jeong | ...................... H04J 13/18 370/335 |

(Continued)

FOREIGN PATENT DOCUMENTS

| EP | 2 398 202 A2 | 12/2011 |
|---|---|---|
| WO | 2013/070149 A1 | 5/2013 |
| WO | 2015/188769 A1 | 12/2015 |

*Primary Examiner* — Phirin Sam
(74) *Attorney, Agent, or Firm* — Sherry W. Schumm

(57) ABSTRACT

A downlink cellular communication signal processing method includes storing resource elements from multiple resource element sequences into multiple sets of consecutive data bins of a composite signal input grid that also includes guard band bins between the sets of data bins. A frequency-domain to time-domain transformation of all values within the composite signal input grid is performed to produce a sequence of time-domain samples (e.g., a portion of an OFDM symbol). The transformation has a number of points equal to or greater than the number of bins in the multiple sets of data bins and the guard band bins. An uplink processing method includes performing a time-domain to frequency-domain transformation on a sequence of time-domain samples to produce resource elements in multiple sets of consecutive data bins of a composite signal output grid that also includes guard band bins between the sets of data bins.

23 Claims, 9 Drawing Sheets

(56) References Cited

U.S. PATENT DOCUMENTS

2016/0192383 A1* 6/2016 Hwang ................ H04L 1/1812
370/330
2017/0181219 A1* 6/2017 Cesares Cano ....... H04W 76/28

* cited by examiner

COMPOSITE SIGNAL PROCESSING IN A CELLULAR COMMUNICATION SYSTEM

CROSS-REFERENCE TO RELATED APPLICATION

This application claims the priority under 35 U.S.C. § 119 of European Patent application no. 17305554.2, filed on May 15, 2017, the contents of which are incorporated by reference herein.

TECHNICAL FIELD

Embodiments of the subject matter described herein relate generally to apparatus and methods for performing signal processing in a cellular communication system.

BACKGROUND

In a conventional cellular base station, various signal processing operations are performed on uplink and downlink cellular communication signals by distinct hardware subsystems that may be located some physical distance away from each other. For example, FIG. 1 illustrates an example of a conventional cellular base station 100, which includes a tower 110, a plurality of antenna arrays 120, 121, 122 (or "sectors"), a plurality of remote radio units (RRUs) 130, 131, 132, and a baseband unit 140.

The plurality of antenna arrays 120-122 (e.g., each array including multiple antennas, such as four, eight, or some other number of antennas) are mounted on the tower 110 at some height above the ground. In addition, the RRUs 130-132, also commonly referred to as "radio heads," are mounted on the tower in locations that are physically close to the antenna arrays 120-122 (e.g., also at some height above the ground). In some cases, an RRU 130-132 and an antenna array 120-122 may be integrated together within a single subsystem, and such an integrated subsystem may be referred to as an "active array." Either way, each RRU 130-132 is communicatively coupled to one of the antenna arrays 120-122, and downlink and uplink signals are exchanged between each RRU/antenna array pair. More specifically, each RRU 130-132 provides downlink radio frequency (RF) signals to an antenna array 120-122 for transmission, by the antenna array 120-122, of corresponding wireless radio signals 123 over the air interface (e.g., to mobile devices such as cellular telephones or other cellular communication devices). In addition, each RRU 130-132 receives uplink RF signals from an antenna array 120-122, which the antenna array 120-122 produces from corresponding wireless radio signals 124 received from the mobile devices over the air interface.

The baseband unit 140 is typically located on the ground near the base of the tower 110, for example in an equipment room, sometimes further away, and potentially co-located with other baseband units. The baseband unit 140 is communicatively coupled to the plurality of RRUs 130-132 through cables 150, 151, 152. Typically, a single cable 150-152 provides connectivity between the baseband unit 140 and each RRU 130-132. Thus, in a base station that includes three RRUs (e.g., base station 100), three cables typically would provide connectivity between the baseband unit and the RRUs. The cables may be, for example, Ethernet cables, fiber optic cables or coaxial cables. In addition, in some systems, the connection between an RRU and a baseband unit alternatively may be implemented as a wireless backhaul.

In conjunction with downlink communications, the baseband unit 140 produces downlink data and communicates the downlink data to the RRUs 130-132 over the cables 150-152. In conjunction with uplink communications, the RRUs 130-132 produce uplink data and communicates the uplink data to the baseband unit 140 over the cables 150-152. Both the downlink data produced by the baseband unit 140 and the uplink data provided by the RRUs 130-132 is communicated over the cables 150-152 according to a defined standard, such as the Common Public Radio Interface (CPRI) standard, for example.

A number of wireless standards are implemented to provide cellular communications between base stations and user equipments. For example, some common wireless standards include GSM (Global System for Mobile communications), WCDMA (Wideband Code Division Multiple Access), WiMAX (Worldwide Interoperability for Microwave Access), Wi-Fi (wireless local area networking based on IEEE 802.11 standards), 4G LTE (Long Term Evolution), and more recently, 5G. Many recent standards, including WiMAX, Wi-Fi, 4G LTE, and 5G, are based on Orthogonal Frequency Division Multiplexing (OFDM), OFDMA (Orthogonal Frequency-Division Multiple Access) and SC-FDMA (Single-Carrier Frequency Division Multiple Access). Using such standards, users' data is conveyed over subcarriers. Typically, the subcarriers are defined by frequencies that are distributed around a carrier center frequency (or "carrier"), with a defined subcarrier spacing between adjacent subcarriers.

Some cellular communications protocols, such as OFDM, utilize multi-carrier modulation techniques to convey users' data through sets of subcarriers that are centered around multiple adjacent carriers. At some point along the downlink and uplink signal processing chains, the multiple signals associated with the multiple carriers must be conveyed between the baseband unit (e.g., baseband unit 140) and the RRUs (e.g., RRUs 130-132) through the cables (e.g., cables 150-152). For example, in a system in which communication is carried out using three carriers, a set of cables may include three cables (e.g., cables 150-152) to communicate between the baseband unit and three RRUs, where each cable conveys multiple downlink and uplink streams associated with the plurality of antennas in the subsequent antenna arrays (e.g., the antennas in each antenna array 120-122).

As can be imagined, the set of cables coupling the baseband unit to the RRUs is a system feature that may limit the amount of data that may be communicated between the sub-systems. Although the use of additional cables may be one way to increase data throughput, the additional cables add system cost and complexity. Accordingly, recent development has been underway to implement data compression techniques. However, the desire for ever-higher data rates continues to present challenges. Accordingly, system designers strive to develop new techniques for base station operation that may enable higher data throughput rates without adding significant system cost or complexity.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the words "exemplary" and "example" mean "serving as an example, instance, or illustration." Any implementation described herein as exemplary or an example is not necessarily to be construed as preferred or advantageous over other implementations. Furthermore, there is no intention to be bound by any expressed or implied theory presented in the preceding technical field, background, or the following detailed description.

As mentioned previously, some cellular communications protocols utilize multi-carrier modulation techniques, such as OFDM or variants such as OFDMA and SC-FDMA, to convey users' data within frequency bands that are centered around multiple carrier frequencies, or "carriers." In accordance with the principles of OFDM, a plurality of orthogonal, closely-spaced subcarrier frequencies, or "subcarriers," are defined around each carrier frequency, thus defining a bandwidth associated with each carrier, and an overall bandwidth encompassing the plurality of carriers. For example, various Long Term Evolution (LTE) standards specify that data is communicated using one or more carriers, and in the multi-carrier cases, the bandwidths associated with adjacent carriers can be contiguous (or "contiguously aggregated"). The bandwidth associated with each carrier may be indicated by the numeric value in the specific name of an LTE standard. For example, for LTE 20 MHz, the bandwidth associated with each carrier is about 20 megahertz (MHz), whereas for LTE 10 MHz, the bandwidth associated with each carrier is about 10 MHz. For the LTE 20 MHz standard, more specifically, the spectral energy associated with each carrier is communicated within about an 18 MHz bandwidth centered around a particular carrier frequency, with a 1 MHz guard band on either side. Within the approximately 18 MHz bandwidth, 1200 adjacent subcarriers are defined, which are 15 kilohertz (kHz) apart from each other. Other standards may have a wider or narrower bandwidth, more or fewer subcarriers, and/or a different spacing between adjacent subcarriers.

Figure 2:
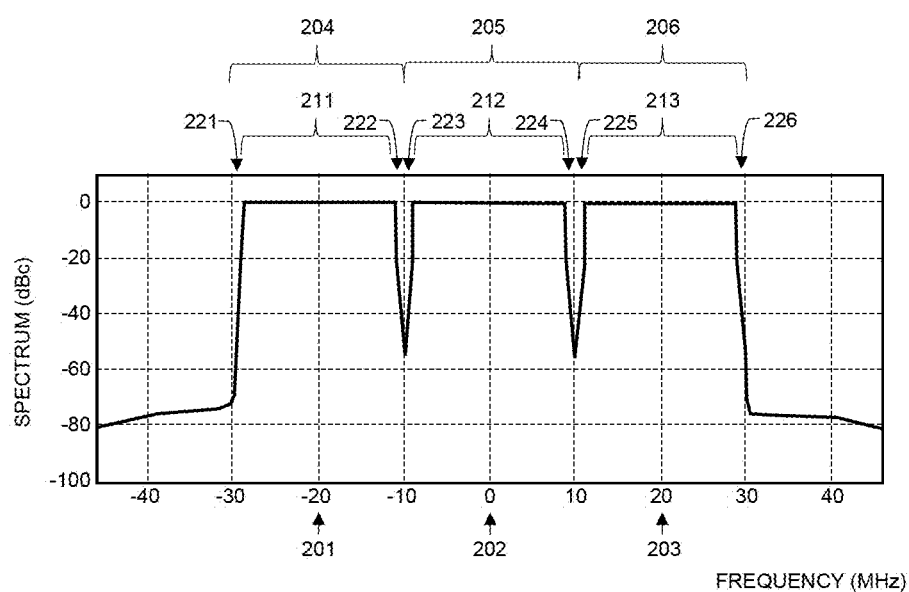
FIG. 2 is a graph of an example of a multi-carrier OFDM signal.

FIG. 2 illustrates the spectral energy of an example signal with three LTE 20 MHz carriers 204, 205, 206 centered around carrier frequencies 201, 202, 203. In FIG. 2, the nominal channel spacing between two adjacent aggregated carriers (i.e., the frequency difference between adjacent carrier frequencies 201-203) is determined according to the following formula, which is specified in 3GPP 36.141, section 5.7.1A:

Nominal channel spacing =

$$\left\lfloor \frac{BW_{Channel1} + BW_{Channel2} - 0.1|BW_{Channel1} - BW_{Channel2}|}{0.6} \right\rfloor 0.3$$

Where $BW_{Channel1}$ and $BW_{Channel2}$ are the channel bandwidths of two respective component carriers with values in MHz, and the channel spacing for intra-band contiguous carrier aggregation can be adjusted to any multiple of 300 kHz less than the nominal channel spacing to optimize performance in a particular system.

As the above explanation indicates, the "natural" spacing of 20 MHz can be in fact rounded down to the closest multiple of 300 kHz, which in this example is 19.8 MHz. The motivation for not using exactly 20 MHz is to ensure full orthogonality between the carriers' subcarriers. Accordingly, the carrier center frequencies normalized around 0 MHz actually are at −19.8 MHz, 0 MHz, and 19.8 MHz, respectively. Each carrier 204-206 includes data-containing subcarriers (e.g., 1200 subcarriers centered around each carrier frequency 201-203), a lower guard band 221, 223, 225, and an upper guard band 222, 224, 226. As used herein, "adjacent carriers" mean carriers with bandwidths (including guard bands) that abut each other in frequency. For example, in FIG. 2, carriers 204, 205 are adjacent to each other, and carriers 205, 206 are adjacent to each other. As indicated above, 1200 subcarriers are evenly spaced around each carrier frequency 201-203 at 15 kHz intervals, thus defining 18 MHz wide data-carrying bands 211, 212, 213, or when a DC subcarrier is included (as explained below) 18.015 MHz wide data-carrying bands 211-213. Ultimately, the encoded signals are all up-converted to radio frequency (RF) signals, which are communicated over the air interface. Through the up-conversion process, the relative positioning of the carriers and subcarriers with respect to each other is maintained.

In conjunction with conventional downlink signal processing, the base station performs a sequence of signal processing operations on a "per-carrier" basis, meaning that the operations are performed separately for each carrier. To illustrate, reference is made to FIG. 3, which is a simplified block diagram of a conventional, multi-carrier downlink processing system 300 configured to process $N_C$ carrier signals 301, 302, 303. For example, $N_C$ may be an integer between 2 and 10 (or more). For each input carrier signal 301-303, a sequence of downlink processing operations first may be performed by a baseband processor 310 (e.g., located in a baseband unit such as baseband unit 140, FIG. 1). On a per-carrier basis, the operations may include, for example:

A process 311, 312, 313 of encoding data (e.g., users' payloads), and mapping the data (e.g., complex-valued symbols) into the bins of a single-carrier input grid (i.e., data structure in memory), where the size of the single-carrier input grid is sufficient to support a subsequent frequency-domain to time-domain transformation of the data for a single carrier. For example, in an LTE 20 system with 1200 subcarriers for each carrier and 0.9 MHz guard bands adjacent the lowest and highest frequency subcarriers (corresponding to about 60 subcarriers for each lower and upper guard band), the size of the single-carrier input grid may include a number of bins equal to or greater than about 1320 bins, or more desirably equal to the next highest power of two greater than 1320 (e.g., an input grid with 211 or 2048 bins).

A process 314, 315, 316 of performing guards insertion into bins within the single-carrier input grid that correspond to subcarrier locations for the guard bands (e.g., bins at the lower and upper edges of the input grid).

A process 317, 318, 319 of performing a frequency-domain to time-domain transformation of the data within the single-carrier input grid to produce a block of time-domain IQ data, or an OFDM symbol. Using the example of the above-defined grid with 2048 bins, for example, the frequency-domain to time-domain transformation may include performing a 2048-point inverse fast Fourier transform (IFFT) on the data within each the single-carrier input grid.

A process 320, 321, 322 of performing cyclic prefix insertion into the time-domain IQ data produced by the conversion process 317-319, which typically includes pre-pending a copy of a portion of the time-domain data located at the end of each OFDM symbol to the beginning of each OFDM symbol, resulting in a time-domain IQ carrier signal 323, 324, 325.

Typically, the above operations are carried out in accordance with an applicable cellular communication specification (e.g., the 3GPP long term evolution (LTE) specification 36.211 or the like). Each processed, time-domain carrier signal 323-325 may then be communicated to a digital front end (DFE) unit 340 (e.g., located in an RRU such as one of RRUs 130-132, FIG. 1) through a cable interface 330, such as a CPRI fiber link that includes a plurality of cables, where each cable may convey data for a sector, and each sector has $N_C$ carriers. The ratio of cables to sectors to carriers may be different, however. The processed carrier signals 323-325 are communicated according to an appropriate specification, such as a CPRI specification, which defines the content and mapping of the digital signals through the cable interface. Often, the specified sampling rate for communication over the cable interface is the same as the sampling rate of the processed carrier signals 323-325. In other words, the carrier signal data 323-325 (i.e., time-domain IQ data) at the per-carrier native rate is communicated through each cable.

Within the DFE unit 340, the separately-processed carrier signals 323-325 each are up-converted by a digital up-converter (DUC) 341, 342, 343 to appropriate final sampling rates with correct frequency offset positioning. Essentially, each DUC 341-343 up-samples a different one of the carrier signals 323-325 to a native rate for carrier mixing and applies a frequency offset. Such up-converted signals 344, 345, 346 are then aggregated into a composite signal 350, in which each subcarrier is automatically placed at its correct relative position across the frequency spectrum by virtue of the application of the above-mentioned frequency offset. Further operations may be performed on the composite signal 350, such as a crest factor reduction (CFR) process 352 and a digital pre-distortion (DPD) process 354. The resulting output signal 360 is then provided to a transceiver (not illustrated) for analog up-conversion (to RF), amplification, and transmission over the air interface.

Similarly, in conjunction with uplink processing, each of the multiple carrier signals within an RF signal received over the air interface are separated out, and then a series of operations is performed separately on each carrier signal to retrieve the baseband data (e.g., in accordance with an LTE specification). To illustrate, reference is made to FIG. 4, which is a simplified block diagram of a conventional, multi-carrier uplink processing system 400 configured to produce $N_C$ processed carrier signals 401, 402, 403. To begin the uplink processing, a DFE unit 440 (e.g., located in an RRU such as RRUs 130-132, FIG. 1) receives an input RF signal 460 from a transceiver (not illustrated). An optional fractional rate change (FRC) process 450 may be performed to apply a first rate change that is common to all carriers as part of a system optimization, resulting in a resampled composite signal 452. The FRC process 450 may render the signal 452 better suited for per-carrier processing with, desirably, only powers-of-two subsequent decimations. Alternatively, the FRC process 450 may be excluded, or the functionality could be implemented within the digital downconverters 441, 442, 443, described below.

The resampled composite signal 452 is provided as $N_C$ carrier signals for subsequent processing in the base station on a per-carrier basis. For each carrier signal 452, a sequence of per-carrier uplink processing operations may include downconverting each carrier signal 452 to an intermediate or baseband frequency by a digital downconverter (DDC) 441, 442, 443 (e.g., located in an RRU). For example, within each DDC 441-443, a first operation may be to apply a frequency offset to the received carrier signal 452 to place the carrier of interest (for the particular DDC) in the center of the sampling rate. Subsequent downsampling stages remove the unwanted neighboring carriers, resulting in a plurality of downconverted carrier signals 423, 424, 425, each of which includes time-domain data for a different one of the aggregated carriers. Each downconverted carrier signal 423-425 (i.e., time-domain data) may then be communicated to a baseband processor 410 (e.g., located in a baseband unit such as baseband unit 140, FIG. 1) through a cable interface 430, such as a CPRI fiber link that includes a plurality of cables. Within the baseband processor 410, the per-carrier operations may include, for example:

a process 420, 421, 422 of performing cyclic prefix removal on the time-domain IQ data carrier signals 423-425, a process 417, 418, 419 of performing a time-domain to frequency-domain transformation of the post-cyclic removal, time-domain IQ data carrier signals (e.g., a fast Fourier transform (FFT)), to produce frequency-domain subcarrier signals, a process 414, 415, 416 of performing guards removal from the frequency-domain carrier signals, and a process 411, 412, 413 of decoding the data (e.g., users' payloads) within each carrier signal to produce $N_C$ baseband data streams 401, 402, 403.

Again, the operations are carried out in accordance with an applicable cellular communication specification (e.g., the 3GPP LTE specification 36.211 or the like).

As indicated above, conventional techniques of downlink and uplink processing each include a significant number of per-carrier operations and per-carrier, time-domain data transfer over a cable interface (e.g., a CPRI fiber link). As discussed previously, a given set of cables may limit the amount of data that may be communicated between the base station sub-systems (e.g., between a baseband unit 140 and a plurality of RRUs 130-132, FIG. 1), and the use of additional cables may be undesirable in that the additional cables may add significant system cost and complexity.

Embodiments of the inventive subject matter include systems and methods for downlink and uplink cellular communication signal processing in which certain processing operations are performed at a composite signal level, rather than being performed at a per-carrier signal level as is done in a conventional system. For example, but not by way of limitation, an embodiment of a downlink processing system and method includes performing some or all of a guards insertion process, an IFFT process, and a cyclic prefix insertion process at a composite signal level, rather than at a per-carrier signal level. Similarly, an embodiment of an uplink processing system and method includes performing some or all of a cyclic prefix removal process, an FFT process, and a guards removal process at a composite signal level, rather than at a per-carrier signal level.

In either the uplink or the downlink processing cases, a composite signal is processed at various stages, and the processed composite signal is communicated over the cable interface (e.g., a CPRI interface) between the baseband unit (e.g., baseband unit 140, FIG. 1) and the RRUs (e.g., RRUs 130-132, FIG. 1) in the form of frequency-domain samples, for example, rather than processing and communicating a plurality of per-carrier signals over the cable interface (e.g., in the form of time-domain complex (IQ) samples). As used herein, the term "composite signal" refers to an uplink or downlink signal, at any stage of processing or transfer, that includes data or signal energy associated with multiple carrier signals (e.g., two, three, or more carrier signals), rather than for only a single carrier signal.

In some embodiments, a composite signal may have a significantly lower data rate than the cumulative data rate of conventional per-carrier data for a multi-carrier signal, either when transferred in the form of time-domain IQ samples or transferred in the form of frequency-domain samples (e.g., data+guards subcarriers). Accordingly, the apparatus and method embodiments may facilitate the achievement of higher data throughput (e.g., through a cable interface), and advanced data compression techniques (e.g., communicating frequency-domain samples rather than time-domain IQ samples) may more readily be used. In addition, implementation of the embodiments may achieve significant signal processing savings, which may translate into power and cost savings. Because certain operations may be performed at a composite signal level rather than a per-carrier signal level, task scheduling also may be simpler, when compared with the task scheduling associated with conventional per-carrier signal processing. In addition, implementation of an embodiment of composite signal processing may utilize less memory than conventional per-carrier signal processing. The signal quality level also may be improved based on the performance of composite-level IFFT/FFT operations.

Figure 5:
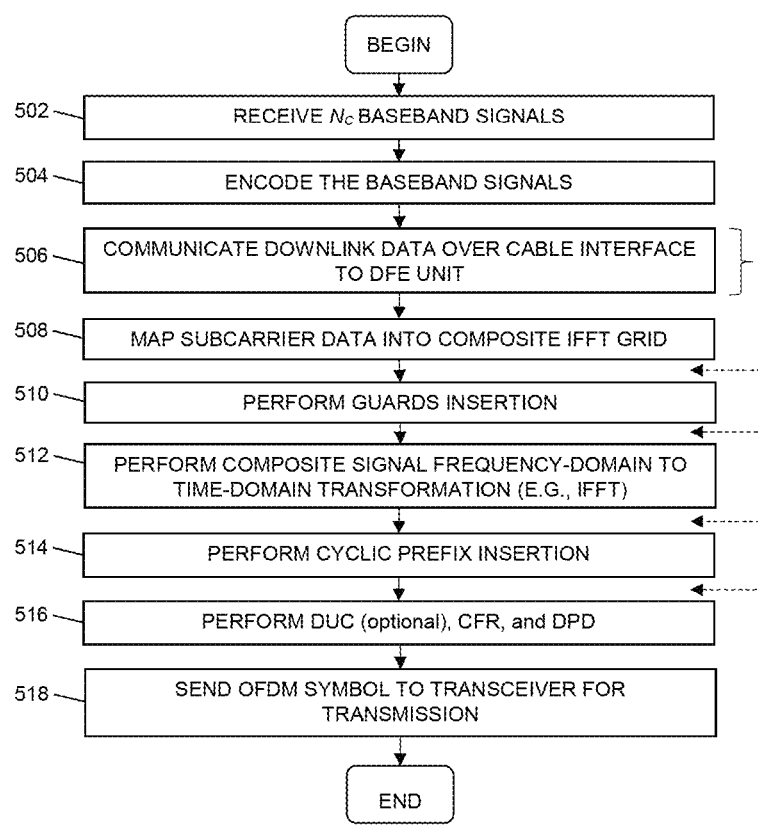
FIG. 5 is a flowchart of a method for performing downlink signal processing using an embodiment of a downlink processing system, in accordance with an example embodiment.
Figure 6:
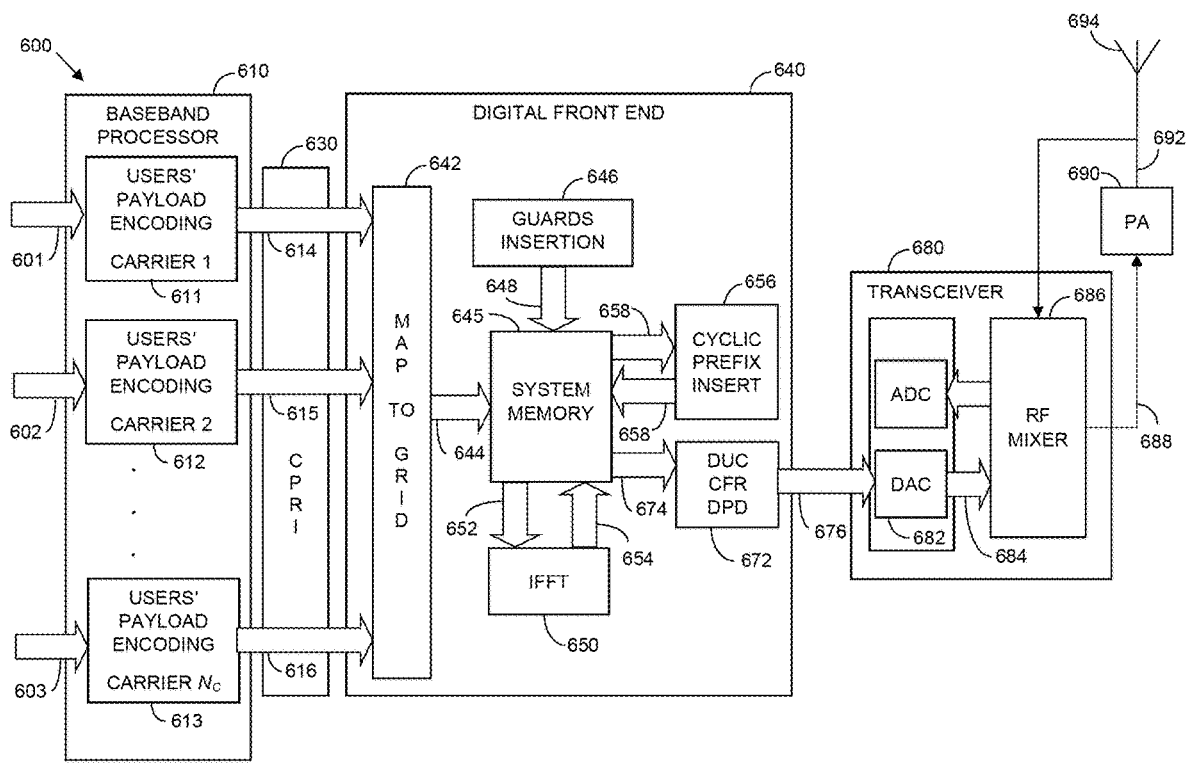
FIG. 6 is a simplified block diagram of a portion of a cellular base station that performs downlink processing, in accordance with an example embodiment.

Several embodiments of downlink signal processing methods and apparatus will now be described in conjunction with FIGS. 5-7. In conjunction with such embodiments, FIG. 5 is a flowchart of a method for performing downlink signal processing using an embodiment of a cellular base station, and FIG. 6 is a simplified block diagram of a portion of a downlink processing system 600 within a cellular base station. The downlink processing system 600 alternatively may be referred to as a "transmitter" below, or more generically as a "cellular communication signal processing system" (or "cellular communication signal processing apparatus"). The downlink processing system 600 includes a baseband processor 610, a cable interface 630, a digital front end (DFE) unit 640, a transceiver 680, a power amplifier 690, and an antenna or antenna array 694. As with the conventional system, downlink processing system 600 is configured to process signals that include $N_C$ baseband signals 601, 602, 603, where $N_C$ may be an integer between 2 and 10 (or more), and $N_C$ corresponds to the number of carriers defined for the system 600.

Figure 1:
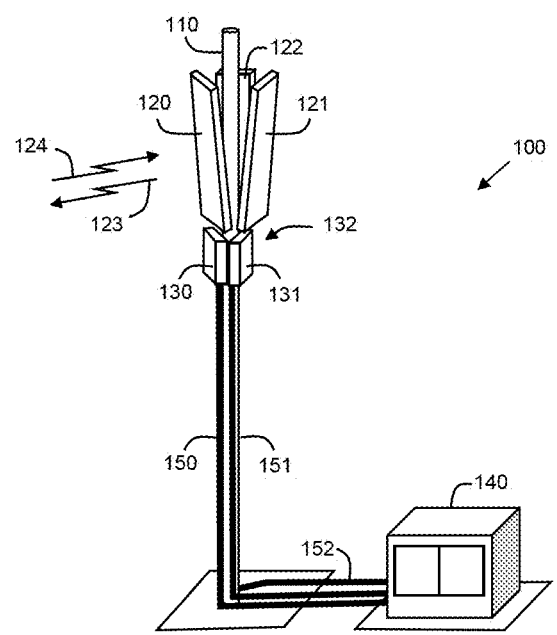
FIG. 1 is an illustration of a conventional base station.

Referring to both FIGS. 5 and 6, $N_C$ baseband signals 601-603 are received in parallel, in block 502, by a baseband processor 610 (e.g., processing circuitry located in a baseband unit such as baseband unit 140, FIG. 1). Each of the $N_C$ baseband signals 601-603 is associated with a different one of $N_C$ carriers, and each of the $N_C$ baseband signals 601-603 includes a sequence of baseband samples that represent users' payload data associated with a particular carrier.

In block 504, an encoding process is performed by a plurality of encoding modules 611, 612, 613 (i.e., circuits and data storage structures configured to convert baseband data into symbols) within the baseband processor 610 on each of the $N_C$ baseband signals 601-603, where the encoding process includes encoding the users' payload data. Any of a variety of modulation techniques may be used for encoding the users' payload data, including but not limited to phase-shift keying (PSK), quadrature amplitude modulation (QAM), dirty paper coding (DPC), or other suitable modulation techniques. For example, encoding the users' payload data using a PSK or QAM process involves converting each set of X consecutive bits of a baseband signal 601-603 into a complex-valued symbol (or "resource element"), where the number of possible symbols, M, in the modulation alphabet is defined as $2^x$. For example, using binary PSK (BPSK), the modulation alphabet includes just 2 symbols, and thus each symbol corresponds to a value of a single bit (i.e., $2^1$=M). Conversely, using quadrature PSK (QPSK), the modulation alphabet includes 4 symbols, and thus each symbol corresponds to a different combination of 2 bits (i.e., $2^2$=M). Alternatively, using 16QAM, the modulation alphabet includes 16 symbols, and thus each symbol corresponds to a different combination of 4 bits (i.e., $2^4$=M). Similarly, using 64QAM, the modulation alphabet includes 64 symbols, and thus each symbol corresponds to a different combination of 6 bits (i.e., $2^6$=M). The encoding process results in $N_C$ complex-valued data sequences 614, 615, 616, where each data sequence includes a sequence of complex-valued symbols (known as "resource elements" in LTE terminology). A complex-valued data sequence produced by the encoding process may be referred to herein as a "resource element sequence", although that terminology is not intended to limit applicability of the inventive subject matter to specific types of systems.

In block 506, each resource element sequence 614-616 (i.e., frequency-domain data with or without the associated guards subcarriers) is then communicated to a DFE unit 640 (e.g., located in an RRU such as one of RRUs 130-132, FIG. 1), in an embodiment, through a cable interface 630 such as a CPRI fiber link. The resource element sequences 614-616 are communicated according to an appropriate specification, such as a CPRI specification, which defines the content and mapping of the symbol sequences through the cable interface 630. The specified sampling rate for communication over the cable interface 630 may be the same as the sampling rate of the resource element sequences 614-616 (i.e., the baud rate), in an embodiment.

Figure 3:
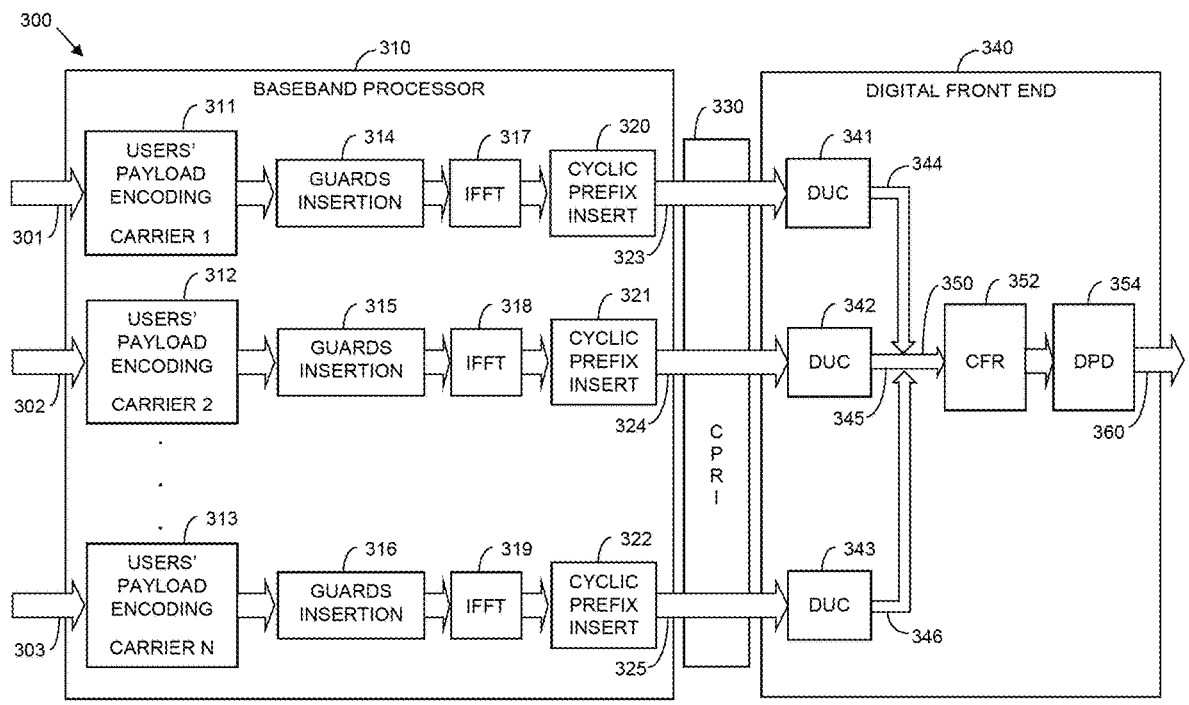
FIG. 3 is a simplified block diagram of a conventional, multi-carrier downlink processing chain.

When compared with a conventional downlink processing system (e.g., as depicted in FIG. 3), transfer of the per-carrier downlink data across the cable interface 630 is performed earlier in the downlink processing chain of operations in the embodiment of FIG. 6. In the embodiment illustrated in FIG. 6, for example, transfer of the downlink data across the cable interface 630 occurs prior to performing a mapping process (e.g., by module 642), prior to performing guards insertion (e.g., by module 646), prior to performing frequency-domain to time-domain transformation (e.g., an IFFT performed by module 650), and prior to performing cyclic prefix insertion (e.g., by module 656). In contrast, in the conventional system of FIG. 3, transfer of the downlink data occurs after performing cyclic prefix insertion (e.g., after process 320-322, FIG. 3).

In other embodiments, however, and as indicated with the dashed arrows to the right of the flowchart of FIG. 5, transfer of the downlink data over the cable interface 630 may be performed later in the process (e.g., after some or all of blocks 508, 510, 512, and or 514 corresponding to processes performed by modules 642, 646, 650, and/or 656, respectively), as some or all of the processes performed by modules 642, 646, 650, and/or 656 may instead be performed by circuitry (e.g., processing circuits and data storage structures) in the baseband unit (e.g., in baseband unit 140, FIG. 1). For example, in an alternate embodiment, the symbol mapping process performed in block 508 by module 642 may be performed by circuitry in the baseband unit, and the downlink frequency-domain data transferred over the cable interface 630 may include a sequence of symbols that are communicated in an ascending or descending order of the subcarriers to which each symbol is mapped during the mapping process performed by module 642. In another alternate embodiment, the guards insertion process performed in block 510 by module 646 may be performed by circuitry in the baseband unit, and the downlink frequency-domain data transferred over the cable interface 630 may include a sequence of symbols that are communicated in an ascending or descending order of the subcarrier to which each symbol is mapped during the mapping process performed by module 642, but with null values inserted in the sequence of symbols in the guard band subcarriers by module 646. In yet another alternate embodiment, the frequency-domain to time-domain transformation process performed in block 512 by module 650 may be performed by circuitry in the baseband unit, and the downlink time-domain data transferred over the cable interface 630 may include a sequence of time-domain samples that represent the result of the frequency-domain to time-domain transformation performed by module 650. In yet another alternate embodiment, the cyclic prefix insertion process performed in block 514 by module 656 may be performed by circuitry in the baseband unit, and the downlink time-domain data transferred over the cable interface 630 may include the sequence of time-domain samples produced by module 650, but with cyclic prefix samples inserted at appropriate locations within the sequence by module 656. Each of these processes and modules will be described in more detail below.

After generation of the per-carrier resource element sequences 614-616 by the encoding modules 611, 612, 613, embodiments of the inventive subject matter perform a "composite signal" or "multi-carrier" frequency-domain to time-domain transformation on the resource element sequences 614-616. As used herein, a "composite signal" or "multi-carrier" frequency-domain to time-domain transformation is a single frequency-domain to time-domain transformation of the resource elements for multiple adjacent carrier signals (i.e., a "composite" signal). For example, the composite signal frequency-domain to time-domain transformation may be implemented using an inverse fast Fourier transform (IFFT). For convenience, references are made below to IFFTs and composite signal IFFTs. Those of skill in the art would understand, based on the description herein, that other types of frequency-domain to time-domain transformations alternatively could be used. Therefore, reference to IFFTs is not meant to be limiting.

To prepare the data for the composite signal frequency-domain to time-domain transformation, a mapping process is performed, in block 508, by a mapping module 642 within the DFE unit 640 (i.e., a circuit configured to store data into a data structure based on a pre-determined mapping scheme). The mapping module 642 maps (or stores) the resource elements 644 in the per-carrier resource element sequences 614-616 into the bins of a "composite signal IFFT input grid" (e.g., grid 700 or 700', FIG. 7), in an embodiment, where the "composite signal IFFT input grid" may be referred to more generally as a "composite signal frequency-domain to time-domain transformation input grid" or more concisely as a "composite signal input grid". For example, the composite signal IFFT input grid may be implemented in the form of a data structure (e.g., a buffer) within a system memory 645 of the DFE unit 640, in an embodiment. As used herein, a "grid" is defined as a data structure configured to store data that is accessed by (e.g., consumed by or produced by) a transformation process (e.g., an IFFT or an FFT). The system memory 645 may include one or more memory devices and data structures (e.g., random access memory (RAM) and other suitable memory types) that are configured to provide data storage capabilities for carrying out the various processes described herein. The composite signal IFFT input grid includes a plurality of "bins", where each bin represents an addressable memory unit. With the exception of "unused bins", discussed later, each of the bins corresponds to a different subcarrier frequency within the bandwidth of the multi-carrier signal to be transmitted, and each bin is configured to store a null value or a complex-valued symbol (e.g., one resource unit or subcarrier). A complex-valued symbol or subcarrier data unit stored in a bin is referred to below as a "resource element". The number of bins (e.g., Nmin or $N_{P2}$, defined later) in the composite signal IFFT input grid is equal to the number, $N_{PC}$, of points of the composite signal IFFT. As described below, a composite signal IFFT is an IFFT with a number of points that is sufficient to encompass the encoded data for the subcarriers associated with multiple carriers (e.g., from 2 carriers up to and including all $N_C$ carriers). Said another way, the number of bins in the composite signal IFFT input grid (and the number of points of the composite signal IFFT) is greater than a number of symbol subcarriers and guard band subcarriers in one of the carrier signals (e.g., greater than 1200 (symbol subcarriers)+about 132 (guard band subcarriers) as per the below-described example).

Figure 7A:
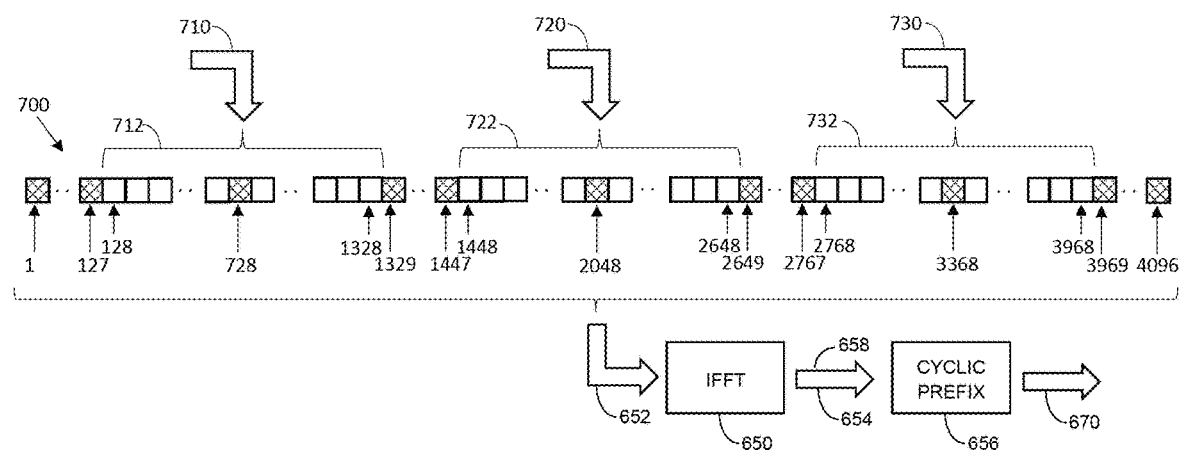
FIG. 7, including FIG. 7a and FIG. 7b, includes depictions of a composite signal inverse fast Fourier transform input grid, in accordance with two example embodiments.
Figure 7B:
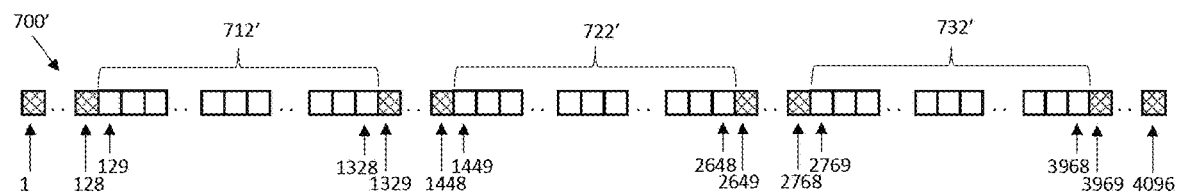

Referring to FIG. 7a, an embodiment of a composite signal IFFT input grid 700 is shown as an example for describing mapping the per-carrier resource elements 710, 720, 730 (e.g., data 613, 614, 615, FIG. 6) for an LTE-20 signal with $N_C$=3 adjacent carriers (each with 1200 subcarriers and 59 subcarriers for the lower guard band and 60 subcarriers for the upper guard band). As mentioned previously, the per-carrier resource elements (e.g., subcarrier data) for all $N_C$ carriers may be stored in a data structure for the composite signal IFFT input grid 700 (e.g., in memory 645). As used herein, "guard band bins" refer to bins that are designated to correspond to guard band subcarriers, and "data bins" refer to bins that are designated to correspond to resource element containing subcarriers (e.g., complex-valued symbol or subcarrier data containing subcarriers). A first set of adjacent data bins 712 corresponds to the data containing subcarriers associated with a lower carrier (e.g., carrier 204, FIG. 2), a second set of adjacent data bins 722 corresponds to the data containing subcarriers associated with a center carrier (e.g., carrier 205, FIG. 2), and a third set of adjacent data bins 732 corresponds to the data containing subcarriers associated with an upper carrier (e.g., carrier 206, FIG. 2). Each of the first, second, and third sets of data bins 712, 722, 732 includes 1200 bins (e.g., bins 128, 1328, 1448, 2648, 2768, 3968). In addition, in an embodiment, a "DC subcarrier" bin 728, 2048, 3368 may be located at the center of each of the first, second, and third sets of data bins 712, 722, 732 (or at the center of each set of data bins). In other embodiments, such as in the alternately arranged composite signal IFFT input grid 700', the DC subcarrier bins may be excluded from the grid 700' (i.e., excluded from the centers of the sets of data bins 712', 722', and 732'), and the number of total unused bins or total guard ban bins may be increased (e.g., by $N_C$). In grid 700, adjacent to the left and right sides, respectively, of each set of data bins 712, 722, 732 are 59 lower guard band bins (e.g., bins 127, 1447, 2767) and 60 upper guard band bins (e.g., bins 1329, 2649, 3969).

In an example configuration with DC subcarriers, the minimum number of bins, Nmin, sufficient to contain the resource elements and guard bands is Nmin=3*(1200 data bins)+3*(59 lower guard band bins)+3*(60 upper guard band bins)+$N_C$=3 DC subcarrier bins=3960 total bins. However, because an IFFT most readily processes a number of points of data that is equal to a power of 2, a more desirable size for the composite signal IFFT input grid is a power of 2 that is equal to or greater than the minimum number of bins. As used herein, a composite signal IFFT input grid with a number of bins, $N_{P2}$, equal to a power of 2 is referred to as a "power of 2 composite signal IFFT input grid". In the present example, 3960 is not a power of 2, and the next power of 2 that is greater than 3960 is 4096 (i.e., $2^{12}$). Thus, in the present example, a more desirable size, $N_{P2}$, for the composite signal IFFT input grid is 4096 bins, in an embodiment. Because $N_{P2}$=4096 is larger than the minimum grid size, Nmin=3960, the power of 2 composite signal IFFT input grid for the present example includes a number, $N_U$, of "unused" or extra bins beyond what is needed to contain the resource elements and the guard bands for the $N_C$=3 carriers. In the present example, the power of 2 composite signal IFFT input grid includes about 136 unused bins (i.e., $N_U$=$N_{P2}$−Nmin=4096−3960=136 unused bins). The size of the IFFT transform (i.e., the number of points) will influence the sampling rate of the time-domain composite signal 654. In the below example, usage of an IFFT of size 4096 for a subcarrier spacing of 15 kHz means spanning over 4096*0.015=61.44 MHz (which may be alternatively referred to as a 61.44 MSPS signal). In an alternate embodiment, the size of the IFFT can also be defined to be larger than the next power of 2 that is greater than the minimum number of bins in order to perform oversampling. For example, choosing an IFFT of size 8192 (i.e., $2^{13}$) for a subcarrier spacing of 15 kHz means spanning over 8192*0.015=122.88 MHz (which may be alternatively referred to as a 122.88 MSPS signal). In the latter case, the number of unused bins would be $N_U$=$N_{P2}$−Nmin=8192−3960=4232 unused bins. Even larger IFFT sizes (e.g., even higher powers of 2) may be used to provide even greater oversampling. In some alternate embodiments, non powers of 2 transform sizes can also be used (e.g., a 6144 point transform) for frequency-domain to time-domain conversion, leading to other sampling rates for the composite signal. This may be beneficial for the subsequent signal processing stages, such as crest factor reduction (CFR) which may have a specific desired sampling rate (e.g., 92.16 MHz). In embodiments that utilize non powers of 2 transform sizes, the IFFT and FFT could be replaced with an inverse discrete Fourier transform (IDFT) and discrete Fourier transform (DFT), respectively.

In an embodiment, about half of the unused bins are assigned to the lowest-numbered bins (i.e., the leftmost $N_U/2$ bins in FIG. 7a) of the composite signal IFFT input grid (e.g., bins 1 to 68), and about half of the unused bins are assigned to the highest-numbered bins (i.e., the rightmost $N_U/2$ bins in FIG. 7a) of the composite signal IFFT input grid (e.g., bins 4029 to 4096). To fill the remaining "used" bins, the resource elements for the $N_C$=3 carriers are stored in sequential order in the data bins of the composite signal IFFT input grid 700, starting from the lowest subcarrier of the lower carrier (e.g., the leftmost subcarrier of carrier 204, FIG. 2) through the highest subcarrier of the upper subcarrier (e.g., the rightmost subcarrier of carrier 206, FIG. 2), while reserving guard band bins on both sides of the data bins for the subcarriers associated with the guard bands. Consistent with the above configuration and referring to the bin reference numbers in FIG. 7, two example mapping tables are provided below for a power of 2 composite signal IFFT input grid with 4096 bins that is configured to contain resource elements and guard bands for $N_C$=3 carriers. The first table (Table 1) corresponds to a power of 2 composite signal IFFT input grid for $N_C$=3 carriers, each with 1200 subcarriers (spaced at 15 kHz), 59 subcarriers wide lower guard bans, 60 subcarriers wide upper guard bands, and a DC subcarrier (e.g., FIG. 7a). The second table (Table 2) corresponds to a power of 2 composite signal IFFT input grid for $N_C$=3 carriers, each with 1200 subcarriers (spaced at 15 kHz), 60 subcarriers wide lower and upper guard bands, and no DC subcarrier (e.g., FIG. 7b):

TABLE 1

($N_C$ = 3: 1200 subcarriers per carrier + 59 or 60 subcarriers guard bands + DC subcarrier)

| bin type | start index | end index | relative baseband frequency of start index (MHz) | example final upconverted frequency of start index (MHz) |
|---|---|---|---|---|
| unused | 1 | 68 | −30.705 | |
| lower guards | 69 | 127 | −29.685 | 1800.315 |
| carrier 1, part 1 | 128 | 727 | −28.800 | 1801.200 |
| carrier 1, DC | 728 | 728 | −19.800 | 1810.200 |
| carrier 1, part 2 | 729 | 1328 | −19.785 | 1810.215 |
| upper guards | 1329 | 1388 | −10.785 | 1819.215 |
| lower guards | 1389 | 1447 | −9.8850 | 1820.115 |
| carrier 2, part 1 | 1448 | 2047 | −9.000 | 1821.000 |
| carrier 2, DC | 2048 | 2048 | 0 | 1830.000 |
| carrier 2, part 2 | 2049 | 2648 | 0.015 | 1830.015 |
| upper guards | 2649 | 2708 | 9.015 | 1839.015 |
| lower guards | 2709 | 2767 | 9.915 | 1839.915 |
| carrier 3, part 1 | 2768 | 3367 | 10.800 | 1840.800 |
| carriers, DC | 3368 | 3368 | 19.800 | 1849.800 |
| carrier 3, part 2 | 3369 | 3968 | 19.815 | 1849.815 |
| upper guards | 3969 | 4028 | 28.815 | 1858.815 |
| unused | 4029 | 4096 | 29.715 | |

TABLE 2

($N_C$ = 3: 1200 subcarriers per carrier + 60 subcarriers guard bands and no DC subcarrier)

| bin type | start index | end index | relative baseband frequency of start index (MHz) | example final upconverted frequency of start index (MHz) |
|---|---|---|---|---|
| unused | 1 | 68 | −30.720 | |
| lower guards | 69 | 128 | −29.700 | 1800.300 |

TABLE 2-continued ($N_C$ = 3: 1200 subcarriers per carrier + 60 subcarriers guard bands and no DC subcarrier)

| bin type | start index | end index | relative baseband frequency of start index (MHz) | example final upconverted frequency of start index (MHz) |
|---|---|---|---|---|
| carrier 1 | 129 | 1328 | −28.800 | 1801.200 |
| upper guards | 1329 | 1388 | −10.800 | 1819.200 |
| lower guards | 1389 | 1448 | −9.900 | 1820.100 |
| carrier 2 | 1449 | 2648 | −9.000 | 1821.000 |
| upper guards | 2649 | 2708 | 9.000 | 1839.000 |
| lower guards | 2709 | 2768 | 9.900 | 1839.900 |
| carrier 3 | 2769 | 3968 | 10.800 | 1840.800 |
| upper guards | 3969 | 4028 | 28.800 | 1858.800 |
| unused | 4029 | 4096 | 29.700 | |

In the example represented in Table 1 (i.e., an embodiment that includes DC subcarriers), the data for the center-adjacent subcarrier of the center carrier (e.g., the data associated with the subcarrier adjacent (to the left) to carrier frequency 202 of carrier 205, FIG. 2) is stored adjacent to the center bin of the composite signal IFFT input grid 700 (e.g., left-adjacent to bin $N_{P2}/2$, or at bin 2047), and the unused bins are evenly divided and allocated to the lowest and highest groups of bins of the grid 700 (e.g., bins 1-68 and 4029-4096). In other words, the resource elements and guard bands for the $N_C$ carriers are centered in the composite signal IFFT input grid 700. In alternate embodiments, the resource elements and guard bands may be mapped to lower or higher bins in the grid 700 (e.g., shifted left or right), although the order of the resource elements would remain the same. For example, the 59 lower guard band bins for the lowest carrier could be allocated to bins 1-59, and the rest of the resource elements could be sequentially placed in the grid 700 with guard subcarriers reserved in appropriate locations, and with 136 unused bins at the high end of the grid 700 (e.g., at bins 3961-4096). Alternatively, bins 1-136 could be designated as unused bins, and the 59 lower guard band bins for the lowest carrier could be placed in the grid 700 starting at bin 137. Alternatively, the unused bins may be divided unevenly and allocated to bins on either side of the resource element and guard band bins.

In any of the above-described embodiments, the bins selected for resource elements and guard bands each correlate with a particular subcarrier frequency in an ascending order. For example, given subcarrier frequencies that are 15 kHz apart in this 4G LTE example, bin 69 may correspond to an up-converted subcarrier frequency of 1.800315 MHz (relative baseband frequency of −29.685 MHz), bin 70 may correspond to an up-converted subcarrier frequency of 1801.2 MHz (relative baseband frequency of −28.8 MHz), bin 2048 may correspond to an up-converted subcarrier frequency of 1.830 MHz (relative baseband frequency of 0 MHz), and so on. All of the bins allocated to guard bands (or "guard band bins") and to resource elements (or "data bins") are arranged in the composite signal IFFT input grid 700 in the same order as they are arranged across the bandwidth of the signal to be transmitted.

After the resource elements 644 have been stored in the composite signal IFFT input grid (e.g., IFFT input grid 700) according to the pre-defined mapping scheme (e.g., as discussed above), a guards insertion process may then be performed, in block 510, by a guards insertion module 646 (i.e., a circuit configured to insert null values into the guard band bins of the composite signal IFFT input grid) in an embodiment. Essentially, the guards insertion process involves storing null values 648 (e.g., zero) in the guard band bins of the composite signal IFFT input grid that are allocated to the guard band subcarriers. For example, in the above-given example corresponding to Table 1 (i.e., an embodiment with DC subcarriers), null values 648 would be stored in lower and upper guard band bins 69-127, 1329-1447, 2649-2767, and 3969-4028. The guards insertion process also may include storing a null value 648 in each DC subcarrier (e.g., subcarriers 728, 2048, 3368, FIG. 7a), when included, and storing null values 648 in the unused bins (e.g., unused bins 1-68 and 4029-4096 in the above-given example of Table 1). As another example, in the above-given example corresponding to Table 2 (i.e., an embodiment without DC subcarriers), null values 648 would be stored in lower and upper guard band bins 69-128, 1329-1448, 2649-2768, and 3969-4028. In an alternate embodiment, null values 648 may be stored in the entire composite signal IFFT input grid prior to mapping the symbols into the data bins of the composite signal IFFT input grid (e.g., prior to performing the mapping process by the mapping module 642), which would have the same result (i.e., ensuring that null values are present in the unused bins, the guard band bins, and the DC subcarrier bins, when included).

In block 512, a frequency-domain to time-domain transformation process (e.g., a composite signal IFFT or another suitable transform) is then performed by a frequency-domain to time-domain transformation module 650 (i.e., a circuit and data storage structure configured to perform a frequency-domain to time-domain transform) on the entire set of data (including null values in unused and guard band bins and resource elements for multiple carriers in data bins) within the composite signal IFFT input grid, which alternatively may be referred to as a frequency-domain composite signal 652. As indicated previously, the number of points, $N_{PC}$, of the composite signal IFFT equals the number of bins (e.g., Nmin or $N_{P2}$) in the composite signal IFFT input grid (e.g., grid 700 or 700'). For example, when the composite signal IFFT input grid includes 4096 bins, the composite signal IFFT would be a 4096 point IFFT. The composite signal IFFT process results in a sequence of complex (IQ) time-domain samples 654, which may be stored within a data structure (e.g., a buffer) in system memory 645, for example. The sequence of time-domain samples 654 produced by the composite signal IFFT module 650 corresponds to an OFDM symbol, and thus the sequence of time-domain samples 654 may be alternatively referred to herein as an "OFDM symbol" 654.

The use of a "composite signal IFFT" in conjunction with the various embodiments contrasts with a conventional system in which each IFFT is configured to perform a frequency-domain to time-domain transformation of the set of resource elements for only one carrier. In such conventional systems, each IFFT input grid has a number of bins that is sufficient to encompass the bandwidth of only one carrier. For example, with x subcarriers (e.g., 1200 data subcarriers and about 132 guard subcarriers) being associated with each of $N_C$ carriers (e.g., $N_C$=3), a conventional system may implement $N_C$ separate IFFTs, with each IFFT having a number of points equal to the lowest power of 2 that is sufficient to process the data for one carrier. For example, if each carrier includes 1332 subcarriers, each per-carrier IFFT typically would be a 2048 (i.e., $2^{11}$) point IFFT. Thus, in a conventional system defined for 3 carriers, the system would perform 3 2048 point IFFTs to convert the frequency-domain data for the 3 carriers into time-domain data.

In contrast with a conventional system that includes $N_C$ IFFTs that each have a number of points sufficient to process a set of resource elements for a single carrier, the number of points for a composite signal IFFT is sufficient to process sets of resource elements for two or more (up to $N_C$) adjacent carriers and their adjacent guard bands. In other words, an embodiment of a system that is configured to process sets of resource elements for $N_C$ adjacent carriers may include a single composite signal IFFT (or at least fewer than $N_C$ IFFTs). For example, the above described embodiment includes a single composite signal IFFT that transforms the sets of resource elements for 3 carriers into time-domain data. Another embodiment may include one composite signal IFFT that transforms the sets of resource elements for 2 of 3 carriers into time-domain data, and a second IFFT that transforms the set of resource elements for the $3^{rd}$ carrier into time-domain data. In other words, in various embodiments, one or more of the IFFTs implemented within a system is a composite signal IFFT with a number of points corresponding to the bandwidth of two or more of the $N_C$ adjacent carrier signals. Theoretically, an embodiment could implement a composite signal IFFT with a number of points corresponding to the bandwidth of more than one of the $N_C$ adjacent carrier signals, such as the bandwidth of an entire first carrier signal, one or more guard bands between the first carrier signal and a second carrier signal, and a fraction of the bandwidth of the second carrier signal.

As discussed above, the mapping module 642 placed the sets of resource elements 614-616 for the multiple carriers at their correct subcarrier locations in the composite signal IFFT input grid prior to performing the composite signal IFFT process by module 650. This may eliminate the need to perform a digital up-conversion (DUC) process (e.g., processes 341-343, FIG. 3) and to shift the time-domain data for each carrier to its correct offset with respect to the other carriers, as is done in a conventional system, prior to combining the per-carrier signals. The channel filtering performed to comply to the spectral emission mask may still be implemented depending on requirements, and such channel filtering may be performed on the composite signal. Further, in an embodiment, the size of the composite signal IFFT (i.e., the number of points), which determines the sampling rate associated with the sequence of time-domain samples 654 produced by the composite signal IFFT, may be selected so that the sampling rate associated with the time-domain samples 654 is at an intermediate sampling rate that is below a final output sampling rate (e.g., below a sampling rate at which the further-processed downlink samples 676 are provided to the transceiver 680). In such an embodiment, and as will be discussed later, a subsequent DUC process (e.g., DUC process performed by module 672 and block 516) may be performed to up-convert the sampling rate of the time-domain samples 654 to the final output sampling rate. Alternatively, the size of the composite signal IFFT may be increased (e.g., by some power of 2) to produce time-domain samples 654 at a higher sampling rate, up to and including the final output sampling rate.

Examples are discussed above and illustrated in FIGS. 7a and 7b for a system that includes a single composite signal IFFT with a number of points sufficient to encompass the entire bandwidth of the $N_C$ adjacent carriers, including their adjacent guard bands. Although the example composite signal IFFT has a number of points sufficient to encompass all $N_C$ adjacent carrier signals, alternate embodiments may include composite signal IFFTs that have a number of points sufficient to encompass two or more, but less than $N_C$, adjacent carrier signals (i.e., when $N_C>2$). In such embodiments, the system may include multiple IFFTs that may have equal or unequal numbers of points, where at least one of the IFFTs is a composite signal IFFT. Further, although the above example corresponds to a system with 3 carriers (i.e., $N_C=3$), 1200 subcarriers per carrier, and about 60 subcarrier wide lower and upper guard bands, other systems may include as few as 2 or greater than 3 carriers (e.g., up to 10 or more carriers), and/or more or fewer subcarriers per carrier, and/or wider or narrower guard bands (i.e., more or fewer subcarriers per guard band).

Said another way, an embodiment of a downlink processing system includes a frequency-domain to time-domain converter (e.g., an IFFT block) with a minimum number of input points sufficient to encompass the bandwidth of two or more adjacent carriers of an $N_C$-carrier signal, up to and including a number of input points sufficient to encompass the bandwidth of all $N_C$ adjacent carrier signals. In a further embodiment, a downlink processing system includes a frequency-domain to time-domain converter with a minimum number of input points sufficient to encompass the bandwidth of two or more adjacent carriers of an $N_C$-carrier signal and the upper and lower guard bands adjacent to each carrier signal, up to and including a number of input points sufficient to encompass the bandwidth of all $N_C$ adjacent carrier signals and their adjacent guard bands. In a still further embodiment, a downlink processing system includes a frequency-domain to time-domain converter with a minimum number of input points sufficient to encompass the bandwidth of two or more adjacent carriers of an $N_C$-carrier signal and the upper and lower guard bands adjacent to each carrier signal, up to and including a number of input points sufficient to encompass the bandwidth of all $N_C$ adjacent carrier signals and their adjacent guard bands, and where the number of IFFT points is a power of two.

Upon completion of the composite signal IFFT process by module 650, in block 514, a cyclic prefix insertion process is then performed, in an embodiment, by a cyclic prefix insertion module 656 (e.g., a circuit configured to read values from and write values to the system memory 645) on the set of time-domain samples 654 (or OFDM symbol 654). The cyclic prefix insertion process includes reading a number of time-domain samples 658 at the end of the OFDM symbol 654 (referred to as "end samples" 658), and copying the end samples 658 before the beginning of the OFDM symbol 654. In other words, the cyclic prefix insertion process prefixes or "pre-pends" the OFDM symbol 654 with a repetition of a portion of the end of the OFDM symbol 654. The end samples 658 may be pre-pended to the OFDM symbol 654 that was previously stored within a buffer in system memory 645, as discussed previously, or the end samples 658 and the OFDM symbol 654 may be copied into a new buffer in system memory 645. This process results in a set of time-domain samples, referred to herein as a prefixed OFDM symbol, which includes the end samples 658 followed by the entire OFDM symbol 654. The cyclic prefix insertion process may serve to provide a guard interval for eliminating inter-symbol interference from a previous OFDM symbol, and to facilitate robust channel estimation and equalization.

Within the DFE unit 640, several additional processes may then be performed on the prefixed OFDM symbol 674, in block 516, by one or more additional modules, represented collectively as module 672. For example, when the time-domain samples making up the pre-pended OFDM symbol 674 are at an intermediate sampling rate that is below the final output sampling rate (e.g., a sampling rate below which the further-processed downlink samples 676 are provided to the transceiver 680), a DUC process may be performed on the prefixed OFDM symbol 674 to up-convert the prefixed OFDM symbol 674 to the final output sampling rate. The DUC process may, for example, include performing a relatively simple channel filter (e.g., a finite impulse response (FIR) filter) to meet spectral emission requirements. As discussed above, however, when the size of the composite signal IFFT is selected to produce time-domain samples 654 that already are at the final output sampling rate, the DUC process may be eliminated.

A plurality of OFDM symbols 674 (i.e., the digital values making up multiple OFDM symbols) may be concatenated together in a pre-defined frame structure, which may include a preamble and other fields, thus producing an OFDM frame (or "frame of transmit data"). Further processes may be performed on the OFDM frame (e.g., by modules 672), such as a crest factor reduction (CFR) process (e.g., to reduce the peak to average power ratio of the transmitted signal) and a digital pre-distortion (DPD) process (e.g., to improve power amplifier linearization). The resulting processed OFDM frame 676 is then provided to transceiver 680 in block 518.

The transceiver 680 includes a digital-to-analog converter 682, which receives the processed OFDM frame 676, and converts the digital values making up the OFDM frame 676 into an analog signal 684 for transmission. The analog signal 684 is then up-converted to a final RF frequency by RF mixer 686. The up-converted RF signal 688 is then provided to a power amplifier (PA) 690 (e.g., a Doherty PA or another suitable type of PA) for amplification. The amplified RF signal 692 is then provided to an antenna array 694 for transmission over the air interface.

In the embodiments described in conjunction with FIGS. 5-7, various circuitry and processes are associated with a baseband processor subsystem (e.g., baseband processor 610) or with a DFE subsystem (e.g., DFE unit 640), and data is communicated between the subsystems through a cable interface (e.g., cable interface 630). In an alternate embodiment, the various circuitry and processes may be implemented within a single co-located cellular communication signal processing system or apparatus. For example, all of the various circuitry and processes performed in the above-described embodiments by the modules within the baseband processor and DFE unit may be implemented within a single multi-chip module or within a System on a Chip (SoC). In such embodiments, the cable interface (e.g., cable interface 630) would not be present in the system. Such alternate embodiments also apply to the receiver system described later in conjunction with FIG. 9. Further, the transmitter and receiver circuitry and functionality may be implemented within a cellular communication signal processing system that is configured to process downlink and uplink signals using distinct and/or common circuitry.

Still other embodiments may be adapted for multiple-input/multiple-output (MIMO) systems. In such embodiments, additional beamforming processes may be performed (e.g., before performing the frequency-domain to time-domain transformation by module 650), and the output time-domain IQ samples (e.g., samples 676) may be provided to multiple transceivers (e.g., multiple instances of transceiver 680) for amplification and transmission using multiple PAs and antenna arrays (e.g., multiple instances of PA 690 and antenna array 694). In such embodiments, DPD processes may be carried out before digital-to-analog conversion (e.g., before DAC 682) on a per-transceiver/PA/antenna array basis to ensure that the digitally pre-distorted signals are distorted appropriately for the PA that will amplify each signal.

The previous discussion describes embodiments of methods and apparatus for downlink processing. Embodiments of uplink processing methods and apparatus may have corresponding features that are suitable for uplink processing. More particularly, embodiments of the inventive subject matter include systems and methods for uplink signal processing in which certain processing operations are performed at a composite signal level, rather than being performed at a per-carrier signal level as is done in a conventional system. For example, but not by way of limitation, an embodiment of an uplink processing system and method includes performing some or all of a cyclic prefix removal process, an FFT process, and a guards removal process at a composite signal level, rather than at a per-carrier signal level. In the uplink processing embodiments, a composite signal is processed at various stages, and the processed composite signal is communicated over the cable interface (e.g., a CPRI interface) between the RRUs (e.g., RRUs 130-132, FIG. 1) and the baseband unit (e.g., baseband unit 140, FIG. 1), rather than processing and communicating a plurality of per-carrier signals over the cable interface.

Figure 8:
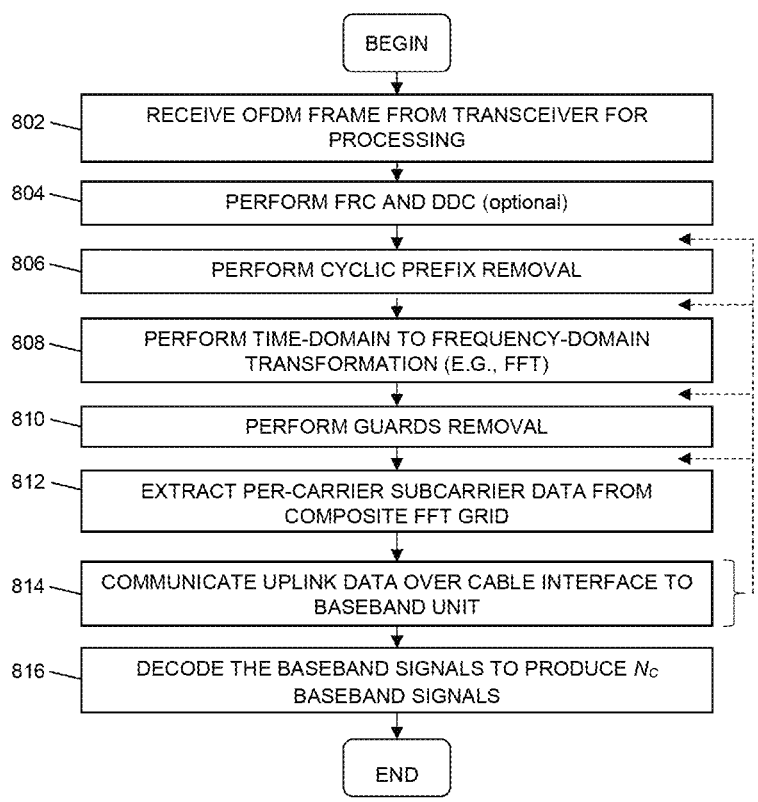
FIG. 8 is a flowchart of a method for performing uplink signal processing using an embodiment of an uplink processing system, in accordance with an example embodiment.
Figure 9:
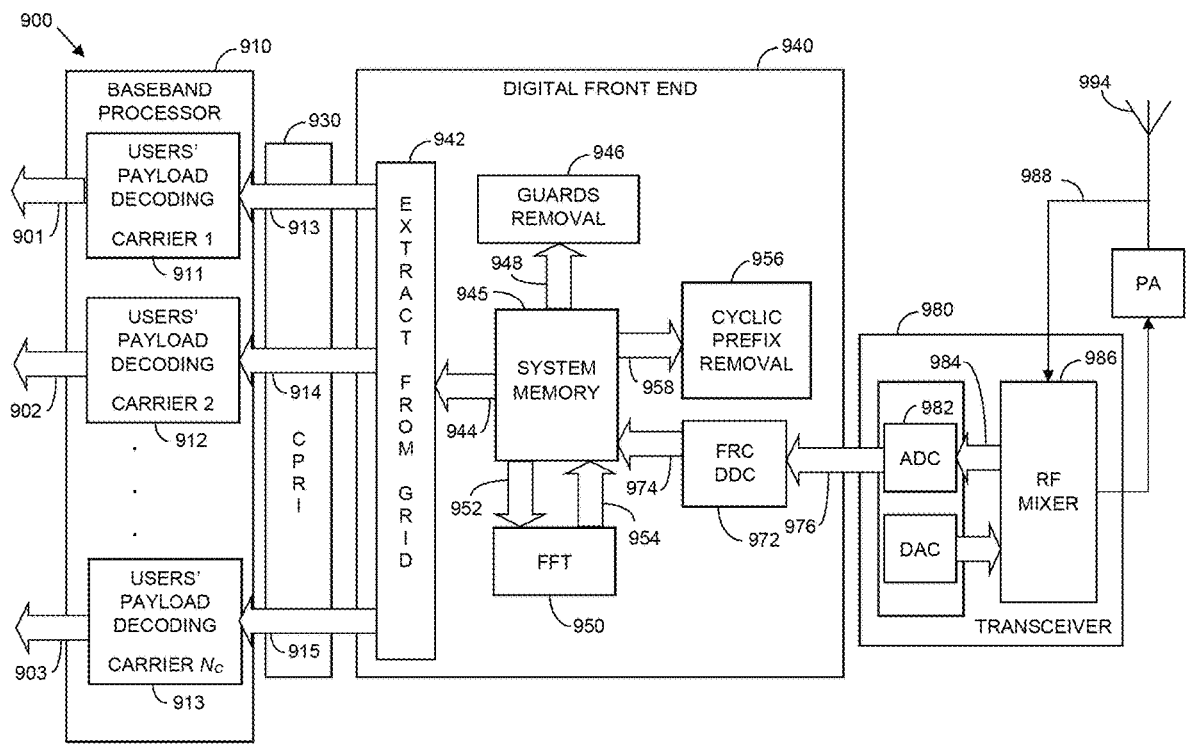
FIG. 9 is a simplified block diagram of a portion of a cellular base station that performs uplink processing, in accordance with an example embodiment.

Several embodiments of uplink signal processing methods and apparatus will now be described in conjunction with FIGS. 8 and 9. In conjunction with such embodiments, FIG. 8 is a flowchart of a method for performing uplink signal processing using an embodiment of a cellular base station, and FIG. 9 is a simplified block diagram of a portion of an uplink processing system 900 within a cellular base station. The uplink processing system 900 alternatively may be referred to as a "receiver" below, or more generically as a "cellular communication signal processing system" (or "cellular communication signal processing apparatus"). The uplink processing system 900 includes a baseband processor 910, a cable interface 930, a DFE unit 940, a transceiver 980, and an antenna array 994. It should be noted at this point that some of the circuitry within baseband processor 910 and DFE unit 940 that is used to perform portions of the downlink processing also may be used to perform portions of the uplink processing. As with the conventional system (e.g., system 400, FIG. 4), uplink processing system 900 is configured to produce $N_C$ baseband signals 901, 902, 903, where $N_C$ may be an integer between 2 and 10 (or more), and $N_C$ corresponds to the number of OFDM carriers defined for the system 900.

Uplink processing begins when antenna array 994 receives an RF signal over the air interface, and converts the received RF signal into an analog RF signal 988 that is provided to transceiver 980. The RF signal 988 may be amplified (e.g., by a low noise amplifier, not illustrated) within the transceiver 980. The transceiver 980 includes an RF mixer 986, which is configured to down-convert the analog signal 988 from a transmission RF frequency to an intermediate or lower frequency. The transceiver 980 also includes an analog-to-digital converter 982, which receives and converts the down-converted RF signal 984 into a sequence of time-domain samples, which represent a series of OFDM frames 976, the boundaries of which may be determined, at least in part, by identifying the locations of preamble data. For ease of explanation, much of the below description of uplink processing pertains to processing a single OFDM symbol that has been extracted from the series of OFDM frames 976. It is to be understood that several the below-described processes (e.g., particularly processes performed by modules 956, 950, and 946) are performed for each OFDM symbol that is extracted from each OFDM frame.

Referring also to FIG. 8, in block 802, the DFE unit 940 receives the time-domain digital values corresponding to an OFDM frame 976 from the transceiver 980, and the DFE unit 940 stores the digital values in a data structure. Preliminary processes may then be performed by module 972, in block 804. For example, the preliminary processes may include an optional fractional rate change (FRC) process, which is configured to apply a first rate change that is common to all carriers as part of a system optimization. The FRC process may render the signal better suited for subsequent processing with, desirably, only powers-of-two subsequent decimations. Alternatively, the FRC process may be excluded, or the functionality could be implemented within the digital downconverter (DDC), described below. In addition, when the time-domain samples making up the OFDM frame 976 are at a sampling rate that is above the sampling rate at which the DFE unit 940 is configured to process the OFDM symbols within the frame 976, a digital downconversion (DDC) process may be performed on the OFDM frame 976 to down-convert the OFDM symbol data within the frame 976 to the desired sampling rate for processing. Upon extraction of an OFDM symbol from the down-converted OFDM frame, the series of time-domain samples associated with the OFDM symbol 974 are stored (e.g., in a data structure in system memory 945) for further processing.

For each OFDM symbol 974 stored in system memory 945, a cyclic prefix removal process is performed, in block 806, by a cyclic prefix removal module 956 (e.g., a circuit configured to delete cyclic prefix data) of the DFE unit 940 on the time-domain samples of the OFDM symbol 974. The cyclic prefix removal process includes "virtually" deleting a number of time-domain samples 958 at the beginning of the OFDM symbol 974, where the deleted samples 958 correspond to end samples (e.g., end samples 658, FIG. 6) that were pre-pended to the symbol in a corresponding cyclic prefix insertion process in the transmitter (e.g., by module 656, FIG. 6). The arrow representing samples 958 in FIG. 9 does not necessarily indicate that the deleted samples 958 are actually read by the cyclic prefix removal module 956. Instead, the samples 958 essentially may be deleted by altering the range of samples to be processed so that the range excludes the cyclic prefix samples. Alteration of the range of samples to be processed may be achieved by modifying the read data pointer so that it addresses a memory location just beyond the cyclic prefix data.

After the cyclic prefix removal process, the data structure includes an OFDM symbol that includes signal energy for multiple carrier signals (e.g., at least two and up to $N_C$ carrier signals). In block 808, a time-domain to frequency-domain transformation process (e.g., a composite signal FFT or another suitable transform) is then performed by a time-domain to frequency-domain transformation module (i.e., a circuit and data storage structure configured to perform a time-domain to frequency-domain transform) on the OFDM symbol data 952 (or the set of time-domain samples making up the OFDM symbol data). Module 950 produces a sequence of complex-valued frequency-domain samples 954 (or resource elements), which are stored in a sequential manner in the bins of a "composite signal FFT output grid" (e.g., an output grid having a similar structure to a corresponding composite signal IFFT input grid in the transmitter, such as grid 700 or 700', FIGS. 7a, 7b). For example, the composite signal FFT output grid, which may be referred to more generally as a "composite signal frequency-domain transformation output grid" or more simply as a "composite signal output grid", may be implemented as a buffer in system memory 980. The size of the composite signal FFT output grid and the number of values 954 produced by the composite signal FFT module 950 equals the number of points, $N_{PC}$, of the composite signal FFT. Further, each bin of the composite signal FFT output grid corresponds to a subcarrier, and the range of subcarriers represented by the composite signal FFT output grid encompasses the bandwidth of two or more (up to all $N_C$) carriers, in an embodiment. Accordingly, the complex values 954 may be referred to as subcarrier data or resource elements. As with the previously-described composite signal IFFT, the number of points for the composite signal FFT may or may not be a power of two. For example, the number of points may be a minimum number of points, Nmin, that is sufficient to span the bandwidth of two or more carriers, or the number of points may be the next higher power of two, $N_{P2}$. In any event, the number of points of the composite signal FFT in the receiver should be the same as the number of points of the corresponding composite signal IFFT in the transmitter. For example, when the composite signal IFFT in the transmitter is a 4096 point IFFT, the composite signal FFT in the receiver should be a 4096 point FFT.

The use of a "composite signal FFT" in conjunction with the various embodiments contrasts with a conventional system in which separate FFTs are performed for each carrier, and each FFT is configured to perform a time-domain to frequency-domain transformation of the time-domain data for only one carrier. In such conventional systems, each FFT output grid has a number of bins that is sufficient to encompass the bandwidth of only one carrier. Referring again to the previous example, with x subcarriers (e.g., 1200 data subcarriers and about 132 guard subcarriers) being associated with each of $N_C$ carriers (e.g., $N_C$=3), a conventional system may implement $N_C$ separate FFTs, with each FFT having a number of points equal to the lowest power of 2 that is sufficient to process the data for one carrier. For example, if each carrier includes 1332 subcarriers, each per-carrier FFT typically would be a 2048 (i.e., 211) point FFT. Thus, in a conventional system defined for 3 subcarriers, the system would perform 3 2048 point FFTs to convert the time-domain data for the 3 carriers into frequency-domain data.

In contrast with a conventional system that includes $N_C$ FFTs that each have a number of points sufficient to process time-domain data for a single carrier, the number of points for a composite signal FFT is sufficient to process time-domain data for two or more (up to $N_C$) adjacent carriers and their adjacent guard bands. In other words, an embodiment of a system that is configured to process time-domain data for $N_C$ adjacent carriers may include a single composite signal FFT (or at least fewer than $N_C$ FFTs). For example, the above described embodiment includes a single composite signal FFT that transforms the time-domain data for 3 carriers into frequency-domain data. Another embodiment may include one composite signal FFT that transforms the time-domain data for 2 of 3 carriers into frequency-domain data, and a second FFT that transforms the time-domain data for the $3^{rd}$ carrier into frequency-domain data. In other words, in various embodiments, one or more of the FFTs implemented within a system is a composite signal FFT with a number of points corresponding to the bandwidth of two or more of the $N_C$ adjacent carrier signals.

In block 810, a guards removal process is performed, in block 810, by a guards removal module 946 (i.e., a circuit configured to remove the values associated with the guard bands) on the frequency-domain samples within the composite signal FFT output grid. The guards removal process essentially includes extracting the frequency-domain data from bins of the composite signal FFT output grid that correspond to data bins (e.g., as defined by the mapping process implemented in the transmitter), while ignoring frequency-domain data in the bins of the composite signal FFT output grid that correspond to guard band bins or unused bins. The arrow representing data in guard band bins 948 in FIG. 9 does not necessarily indicate that the data in guard band bins 948 are actually read by the guards removal process. Instead, the guard band data 948 essentially may be removed by extracting the data in the data bins from the composite signal FFT output grid, or by modifying the read data pointers so that they point only to memory locations that correspond to data bins during subsequent read operations, while ignoring or bypassing addresses associated with guard band bins and unused bins.

An extraction process is performed in block 812, by an extraction module 942 (i.e., a circuit configured to read data from system memory 945 in a pre-determined order). Essentially, module 942 reads the resource elements 944 in the data bins of the composite signal FFT output grid, and separates the resource elements 944 into $N_C$ resource element sequences 913, 914, 915. Each complex-valued resource element is associated with a particular subcarrier frequency, as determined by the bin from which the resource element was extracted. Accordingly, the module 942 is configured to extract the data so that resource elements in data bins associated with carrier 1 are included in resource element sequence 913 (i.e., a first complex-valued symbol sequence), resource elements in data bins associated with carrier 2 are included in resource element sequence 914 (i.e., a second complex-valued symbol sequence), and so on.

In block 814, each resource element sequence 913-915 is then communicated to a baseband processor 910 (e.g., located in baseband unit such as baseband unit 140, FIG. 1), in an embodiment, through a cable interface 930 such as a CPRI fiber link that includes a plurality of cables. The resource element sequences 913-915 are communicated according to an appropriate specification, such as a CPRI specification, which defines the content and mapping of the resource element sequences through the cable interface 930. The specified sampling rate for communication over the cable interface 930 may be the same as the sampling rate of the resource element sequences 913-915 (i.e., the baud rate), in an embodiment.

Figure 4:
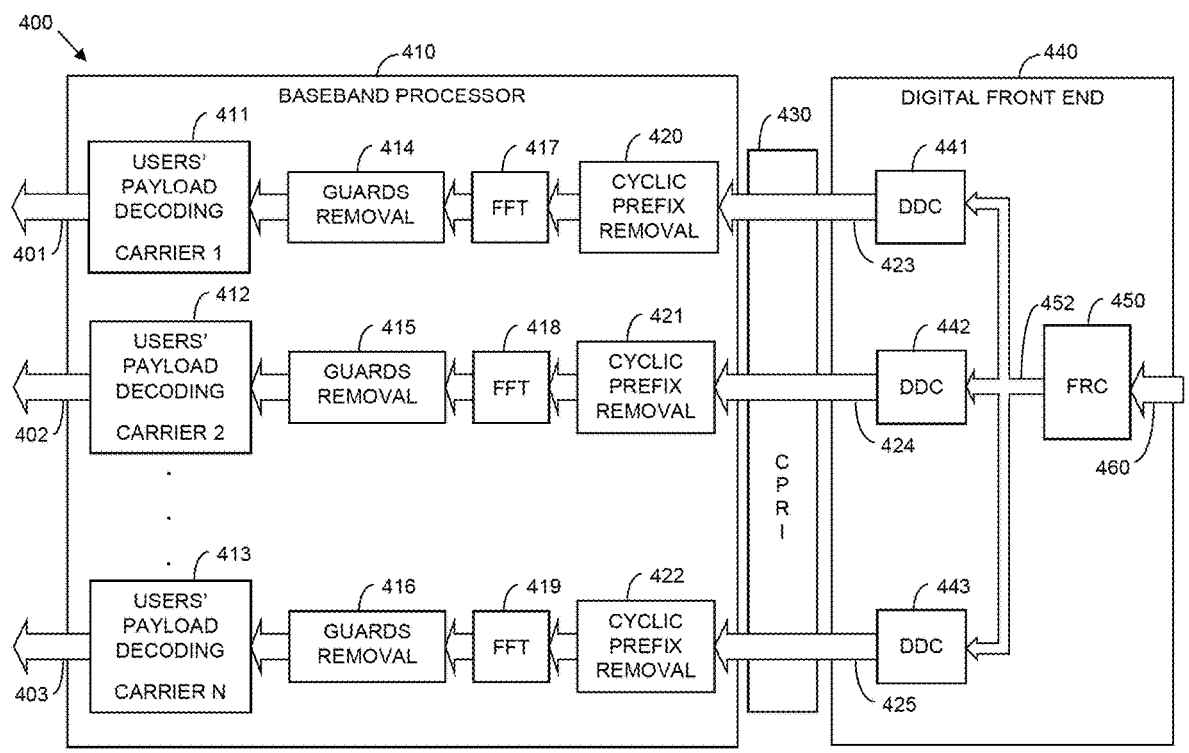
FIG. 4 is a simplified block diagram of a conventional, multi-carrier uplink processing chain.

When compared with a conventional uplink processing system (e.g., as depicted in FIG. 4), transfer of the per-carrier uplink data across the cable interface 930 is performed later in the uplink processing chain of operations in the embodiment of FIG. 9. In the embodiment illustrated in FIG. 9, for example, transfer of the uplink data across the cable interface 930 occurs after performing a per-carrier resource element extraction process (e.g., by module 942), after performing guards removal (e.g., by module 946), after performing time-domain to frequency-domain transformation (e.g., an FFT performed by module 950), and after performing cyclic prefix removal (e.g., by module 956). In contrast, in the conventional system of FIG. 4, transfer of the uplink data occurs before performing cyclic prefix removal (e.g., before process 420-422, FIG. 4).

In other embodiments, however, and as indicated with the dashed arrows to the right of the flowchart of FIG. 8, transfer of the uplink data over the cable interface 930 may be performed earlier in the process (e.g., before some or all of blocks 806, 808, 810, and/or 812 corresponding to processes performed by modules 942, 946, 950, and/or 956, respectively), as some or all of the processes performed by modules 942, 946, 950, and/or 956 may instead be performed by circuitry (e.g., processing circuits and data storage structures) in the baseband unit (e.g., in baseband unit 140, FIG. 1).

In block 816, a decoding process is performed by decoding modules 911, 912, 913 (i.e., circuits and data storage structures configured to convert the resource elements into baseband data) in the baseband processor 910 on each of the $N_C$ resource element sequences 913, 914, 915 to produce $N_C$ baseband signals 901-903 (e.g., users' payload data). The decoding processes performed by modules 911-913 is consistent with the modulation technique used in the transmitter to initially encode the data (e.g., including modulation techniques such as PSK, QAM, DPC, or other suitable modulation techniques). Each of the $N_C$ baseband signals 901-903 includes a sequence of baseband samples that represent users' payload data that was communicated over the air interface within a particular carrier.

The orders of operations associated with the blocks depicted in FIGS. 5 and 8 correspond to various example embodiments, and the depicted orders should not be construed to limit the sequence of operations only to the illustrated orders. Instead, some operations may be performed in different orders, and/or some operations may be performed in parallel.

An embodiment of a cellular communication signal processing apparatus includes a mapping module and a frequency-domain to time-domain transformation module. The mapping module is configured to receive a plurality of resource element sequences (where each of the resource element sequences is intended for communication using a different one of a plurality of carrier signals), to store a first set of resource elements from a first one of the resource element sequences into a first set of consecutive data bins of a composite signal input grid implemented as a data structure, and to store a second set of resource elements from a second one of the resource element sequences into a second set of consecutive data bins of the composite signal input grid, wherein the composite signal input grid also includes a first set of consecutive guard band bins located between the first and second sets of consecutive data bins. The frequency-domain to time-domain transformation module is configured to perform a frequency-domain to time-domain transformation of all values within the composite signal input grid, where the frequency-domain to time-domain transformation has a number of points equal to or greater than a number of bins in the first set of consecutive data bins, the second set of consecutive data bins, and the first set of consecutive guard band bins, and where the frequency-domain to time-domain transformation produces a set of time-domain IQ samples.

An embodiment of a method for generating a cellular communication signal to be communicated over a number, $N_C$, of carrier signals, wherein $N_C$ is greater than one, includes storing, by a mapping module, resource elements within $N_C$ resource element sequences into a composite signal input grid, where the composite signal input grid includes $N_C$ sets of consecutive data bins, and $N_C$-1 sets of consecutive guard band bins interleaved between the $N_C$ sets of consecutive data bins. Storing the resource elements includes storing resource elements from each of the $N_C$ resource element sequences into a different one of the $N_C$ sets of consecutive data bins. The method further includes performing, by a frequency-domain to time-domain transformation module, a frequency-domain to time-domain transformation of all values within the composite signal input grid, where the frequency-domain to time-domain transformation has a number of points equal to or greater than a number of bins in the $N_C$ sets of consecutive data bins and the $N_C-1$ sets of consecutive guard band bins, and where the frequency-domain to time-domain transformation produces a set of time-domain samples.

Another embodiment of a method for processing a cellular communication signal by a cellular communication signal processing apparatus includes receiving, by a mapping module, a plurality of resource element sequences, where each of the resource element sequences is intended for communication using a different one of a plurality of carrier signals of a multiple-carrier RF signal. The method further includes storing resource elements from the plurality of resource element sequences into a composite signal input grid that is implemented as a data structure, and that includes a first set of consecutive data bins, a second set of consecutive data bins, and a first set of consecutive guard band bins located in the data structure between the first and second sets of consecutive data bins. Storing the resource elements includes storing a first set of resource elements from a first one of the resource element sequences into the first set of consecutive data bins, and storing a second set of resource elements from a second one of the resource element sequences into the second set of consecutive data bins. The method further includes performing, by a frequency-domain to time-domain transformation module, a frequency-domain to time-domain transformation of all values within the composite signal input grid, where the frequency-domain to time-domain transformation has a number of points equal to or greater than a number of bins in the first set of consecutive data bins, the second set of consecutive data bins, and the first set of consecutive guard band bins, and where the frequency-domain to time-domain transformation produces a set of time-domain IQ samples.

An embodiment of a cellular communication signal processing apparatus includes a time-domain to frequency-domain transformation module and an extraction module. The time-domain to frequency-domain transformation module is configured to perform a time-domain to frequency-domain transformation of a set of time-domain IQ samples to produce a set of complex-valued frequency-domain resource elements, and to store the resource elements in bins of a composite signal output grid, where a first set of consecutive bins of the composite signal output grid include first data bins that correspond to a first set of subcarriers associated with a first carrier frequency, a second set of consecutive bins of the composite signal output grid include second data bins that correspond to a second set of subcarriers associated with a second carrier frequency, and a third set of consecutive bins of the composite signal output grid include guard band bins that correspond to at least one guard band between the first and second sets of subcarriers. The extraction module is configured to read the resource elements from the first data bins to produce a first resource element sequence, and to read the resource elements from the second data bins to produce a second resource element sequence.

An embodiment of a method for processing a cellular communication signal by a cellular communication signal processing apparatus includes performing, by a time-domain to frequency-domain transformation module, a time-domain to frequency-domain transformation of a set of time-domain samples to produce a sequence of complex-valued frequency-domain resource elements stored in bins of a composite signal output grid, where a first set of consecutive bins of the composite signal output grid include first data bins that correspond to a first set of subcarriers associated with a first carrier frequency, a second set of consecutive bins of the composite signal output grid include second data bins that correspond to a second set of subcarriers associated with a second carrier frequency, and a third set of consecutive bins of the composite signal output grid include guard band bins that correspond to at least one guard band between the first and second sets of subcarriers. The method further includes reading, by an extraction module, the resource elements from the first data bins to produce a first resource element sequence, and reading, by the extraction module, the subcarrier data values from the second data bins to produce a second resource element sequence.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. Various changes can be made in the function and arrangement of elements without departing from the scope defined by the claims, which includes known equivalents and foreseeable equivalents at the time of filing this patent application.

What is claimed is:

1. A cellular communication signal processing apparatus comprising:
   a mapping module configured
      to receive a plurality of resource element sequences, wherein each of the resource element sequences is intended for communication using a different one of a plurality of carrier signals,
      to store a first set of resource elements from a first one of the resource element sequences into a first set of consecutive data bins of a composite signal input grid implemented as a data structure, and to store a second set of resource elements from a second one of the resource element sequences into a second set of consecutive data bins of the composite signal input grid, wherein the composite signal input grid also includes a first set of consecutive guard band bins located between the first and second sets of consecutive data bins; and a frequency-domain to time-domain transformation module configured to perform a frequency-domain to time-domain transformation of all values within the composite signal input grid, wherein the frequency-domain to time-domain transformation has a number of points equal to or greater than a number of bins in the first set of consecutive data bins, the second set of consecutive data bins, and the first set of consecutive guard band bins, and wherein the frequency-domain to time-domain transformation produces a set of time-domain samples.

2. The cellular communication signal processing apparatus of claim 1, further comprising:

a guards insertion module configured to store null values in the consecutive guard band bins before the frequency-domain to time-domain transformation module performs the frequency-domain to time-domain transformation.

3. The cellular communication signal processing apparatus of claim 1, further comprising:

a cyclic prefix insertion module configured to prepend, before a beginning of the set of time-domain samples, a copy of a number of samples at an end of the set of time-domain samples.

4. The cellular communication signal processing apparatus of claim 1, further comprising:

a cable interface coupled to the mapping module, wherein the mapping module is configured to receive the resource element sequences from a baseband processor over the cable interface.

5. The cellular communication signal processing apparatus of claim 1, further comprising:

an analog-to-digital converter configured to convert digital values that are generated based on the time-domain samples into an analog signal for transmission;

an RF mixer configured to up-convert the analog signal to an RF frequency to produce an up-converted RF signal;

a power amplifier configured to amplify the up-converted RF signal to produce an amplified RF signal; and an antenna configured to transmit the amplified RF signal over an air interface.

6. A method for generating a cellular communication signal to be communicated over a number, $N_C$, of carrier signals, wherein $N_C$ is greater than one, and the method comprises:

storing, by a mapping module, resource elements within $N_C$ resource element sequences into a composite signal input grid, wherein the composite signal input grid includes $N_C$ sets of consecutive data bins, and sets of consecutive guard band bins interleaved between the $N_C$ sets of consecutive data bins, and wherein storing the resource elements includes storing resource elements from each of the $N_C$ resource element sequences into a different one of the $N_C$ sets of consecutive data bins; and performing, by a frequency-domain to time-domain transformation module, a frequency-domain to time-domain transformation of all values within the composite signal input grid, wherein the frequency-domain to time-domain transformation has a number of points equal to or greater than a number of bins in the $N_C$ sets of consecutive data bins and the $N_C-1$ sets of consecutive guard band bins, and wherein the frequency-domain to time-domain transformation produces a set of time-domain IQ samples.

7. The method of claim 6, wherein the composite signal input grid also includes a first additional set of consecutive guard band bins positioned before a first one of the $N_C$ sets of consecutive data bins, and a second additional set of consecutive guard band bins positioned after a last one of the $N_C$ sets of consecutive data bins.

8. The method of claim 7, wherein the composite signal input grid also includes a plurality of unused bins so that a total number of bins in the composite signal input grid is a power of 2, and the number of points in the frequency-domain to time-domain transformation is the power of 2.

9. The method of claim 6, wherein the frequency-domain to time-domain transformation is an inverse fast Fourier transform.

10. The method of claim 6, further comprising:

after performing the frequency-domain to time-domain transformation process, performing a cyclic prefix insertion process on the set of time-domain IQ samples by prepending, before a beginning of the set of time-domain IQ samples, a copy of a number of samples at an end of the set of time-domain IQ samples.

11. The method of claim 6, wherein the set of time-domain IQ samples forms at least a portion of an orthogonal frequency division multiplexing (OFDM) symbol.

12. The method of claim 6, further comprising;

receiving, by the mapping module, the $N_C$ resource element sequences from a baseband processor over a cable interface.

13. The method of claim 6, further comprising:

performing additional processing on the set of time-domain data to produce a plurality of digital values;

converting the digital values into an analog signal for transmission;

up-converting the analog signal to an RF frequency to produce an up-converted RF signal;

amplifying the up-converted RF signal to produce an amplified RF signal; and transmitting the amplified RF signal over an air interface.

14. A cellular communication signal processing apparatus comprising:

a time-domain to frequency-domain transformation module configured to perform a time-domain to frequency-domain transformation of a set of time-domain samples to produce a set of complex-valued frequency-domain resource elements, and to store the resource elements in bins of a composite signal output grid, wherein a first set of consecutive bins of the composite signal output grid include first data bins that correspond to a first set of subcarriers associated with a first carrier frequency, a second set of consecutive bins of the composite signal output grid include second data bins that correspond to a second set of subcarriers associated with a second carrier frequency, and a third set of consecutive bins of the composite signal output grid include guard band bins that correspond to at least one guard band between the first and second sets of subcarriers; and an extraction module configured to read the resource elements from the first data bins to produce a first resource element sequence, and to read the resource elements from the second data bins to produce a second resource element sequence.

15. The cellular communication signal processing apparatus of claim 14, wherein the extraction module is further configured to communicate the first and second resource element sequences to a baseband processor over a cable interface.

16. A method for processing a cellular communication signal by a cellular communication signal processing apparatus, the method comprising:
performing, by a time-domain to frequency-domain transformation module, a time-domain to frequency-domain transformation of a set of time-domain samples to produce a sequence of complex-valued frequency-domain resource elements stored in bins of a composite signal output grid, wherein a first set of consecutive bins of the composite signal output grid include first data bins that correspond to a first set of subcarriers associated with a first carrier frequency, a second set of consecutive bins of the composite signal output grid include second data bins that correspond to a second set of subcarriers associated with a second carrier frequency, and a third set of consecutive bins of the composite signal output grid include guard band bins that correspond to at least one guard band between the first and second sets of subcarriers;
reading, by an extraction module, the resource elements from the first data bins to produce a first resource element sequence; and
reading, by the extraction module, the subcarrier data values from the second data bins to produce a second resource element sequence.

17. The method of claim 16, further comprising:
communicating, by the extraction module, the first and second resource element sequences to a baseband processor over a cable interface.

18. A method for processing a cellular communication signal by a cellular communication signal processing apparatus, the method comprising:
receiving, by a mapping module, a plurality of resource element sequences, wherein each of the resource element sequences is intended for communication using a different one of a plurality of carrier signals of a multiple-carrier RF signal;
storing resource elements from the plurality of resource element sequences into a composite signal input grid that is implemented as a data structure, and that includes a first set of consecutive data bins, a second set of consecutive data bins, and a first set of consecutive guard band bins located in the data structure between the first and second sets of consecutive data bins, and wherein storing the resource elements includes
storing a first set of resource elements from a first one of the resource element sequences into the first set of consecutive data bins, and
storing a second set of resource elements from a second one of the resource element sequences into the second set of consecutive data bins; and
performing, by a frequency-domain to time-domain transformation module, a frequency-domain to time-domain transformation of all values within the composite signal input grid, wherein the frequency-domain to time-domain transformation has a number of points equal to or greater than a number of bins in the first set of consecutive data bins, the second set of consecutive data bins, and the first set of consecutive guard band bins, and wherein the frequency-domain to time-domain transformation produces a set of time-domain IQ samples.

19. The method of claim 18, wherein the composite signal input grid also includes a plurality of unused bins so that a total number of bins in the composite signal input grid is a power of 2, and the number of points in the frequency-domain to time-domain transformation is the power of 2.

20. The method of claim 18, wherein the frequency-domain to time-domain transformation is an inverse fast Fourier transform.

21. The method of claim 18, further comprising:
storing null values in the $N_C-1$ sets of consecutive guard band bins before performing the frequency-domain to time-domain transformation.

22. The method of claim 18, further comprising:
after performing the frequency-domain to time-domain transformation process, performing a cyclic prefix insertion process on the set of time-domain IQ samples by prepending, before a beginning of the set of time-domain IQ samples, a copy of a number of samples at an end of the set of time-domain IQ samples.

23. The method of claim 18, further comprising;
receiving, by the mapping module, the resource element sequences from a baseband processor over a cable interface.

* * * * *